(No Model.) 3 Sheets—Sheet 2.
A. H. BEYER.
MUSICAL INSTRUMENT.
No. 518,219. Patented Apr. 17, 1894.
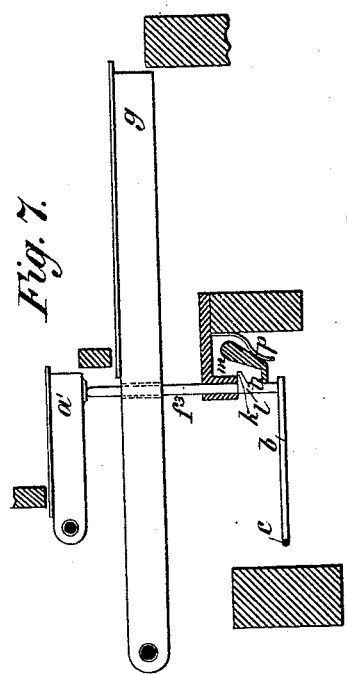
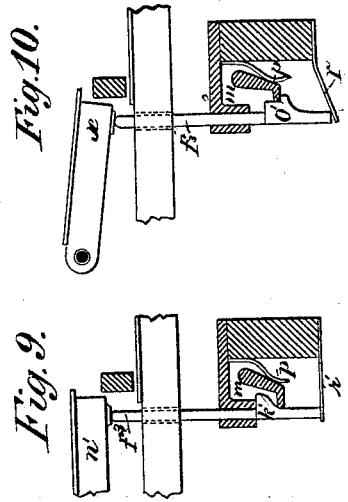
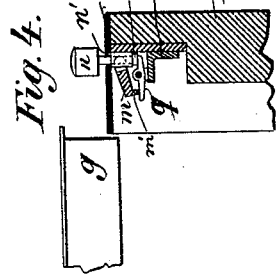
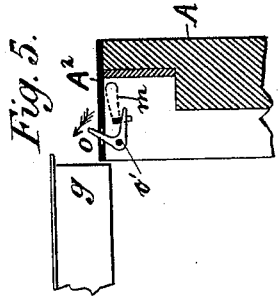
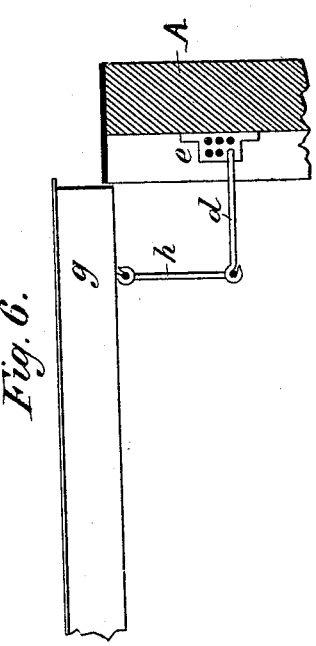
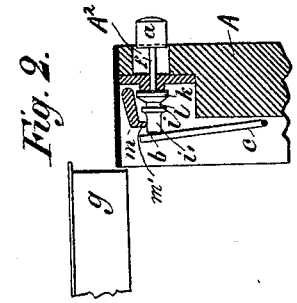
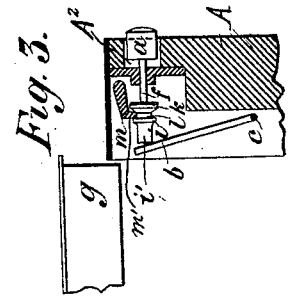
Witnesses:
H. K. Boulter
O. S. Northup
Inventor
Anton H. Beyer,
by his attorney Wm. E. Poulter.
THE NATIONAL LITHOGRAPHING COMPANY,
WASHINGTON, D. C.

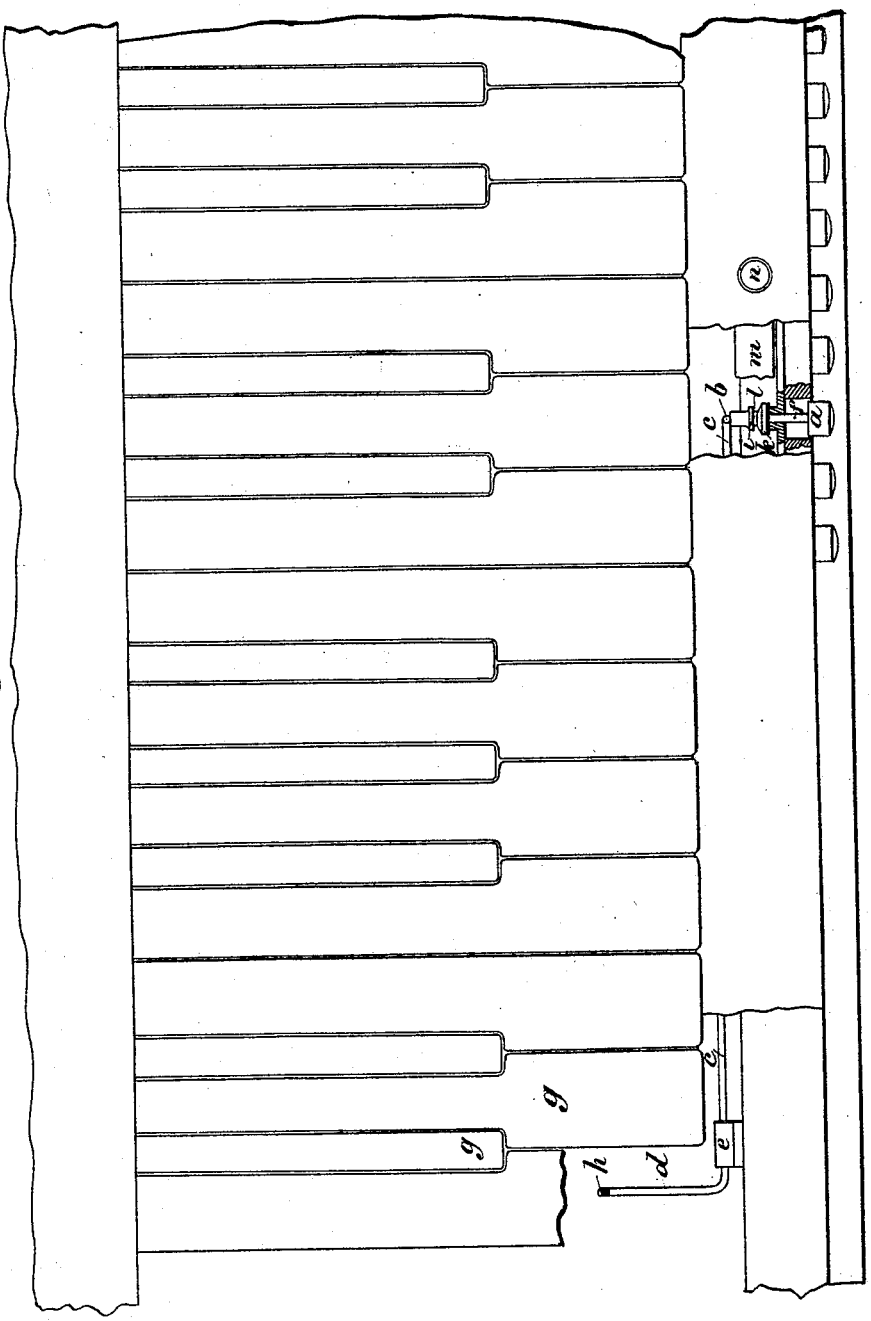

(No Model.)  
3 Sheets—Sheet 3.
A. H. BEYER.
MUSICAL INSTRUMENT.
No. 518,219.  
Patented Apr. 17, 1894.
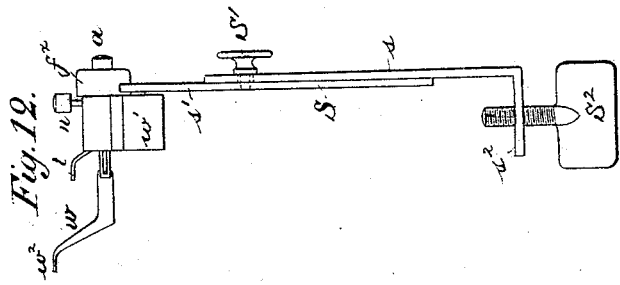
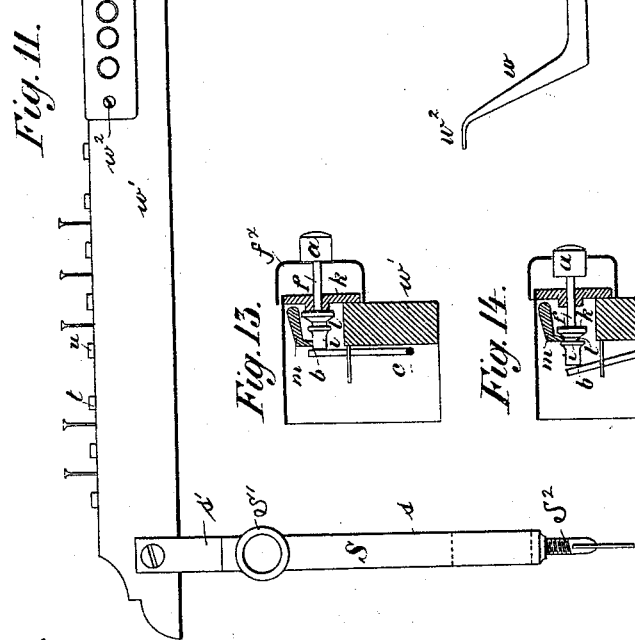
Witnesses:  
H. K. Boulter  
O. J. Northup
Inventor:-  
Anton H. Beyer.  
by his attorney Wm. E. Boulter.
THE NATIONAL LITHOGRAPHING COMPANY,  
WASHINGTON, D. C.

UNITED STATES PATENT OFFICE.

ANTON HUGO BEYER, OF LONDON, ENGLAND.

MUSICAL INSTRUMENT.

SPECIFICATION forming part of Letters Patent No. 518,219, dated April 17, 1894.

Application filed November 19, 1892. Serial No. 452,558. (No model.) Patented in Sweden March 28, 1889, No. 1,761; in England July 6, 1889, No. 9,989, and in Germany December 31, 1889, No. 50,174.

*To all whom it may concern:*

Be it known that I, ANTON HUGO BEYER, a subject of the King of Sweden and Norway, residing at London, England, have invented certain new and useful Improvements in Musical Instruments, (for which I have obtained Letters Patent in Sweden, dated March 28, 1889, No. 1,761; in Germany, dated December 31, 1889, No. 50,174; and in Great Britain, dated July 6, 1889, No. 9,989,) of which the following is a full, clear, and exact description.

My invention has relation to musical instruments, and more particularly to organs, harmoniums, and similar instruments.

Among the objects sought to be attained by my invention is to provide simple and easily operated means whereby a tone or tones may be continued or prolonged without rendering it necessary for the performer to depress the corresponding key or keys or keep his finger or fingers pressed upon the said key or keys during the continuation of the tone or tones, whereby he may have the use of his finger or fingers for manipulating other keys or resting them, as he may desire.

Other objects and advantages of my invention will be apparent from the following description when taken in connection with the accompanying drawings, and with the various objects in view, the invention consists in the construction, arrangement and combination of parts, all as hereinafter fully described, illustrated in the drawings, and pointed out in the claims.

In the said drawings:—Figure 1 is a plan view of a portion of a key-board of an organ, partly broken away and sectioned to show the arrangement of my improved devices. Figs. 2 and 3 are vertical sections of said devices showing the same in different positions. Figs. 4 and 5 are similar views of different means for permitting the depressed key or keys to resume their normal positions. Fig. 6 is a sectional elevation showing the connection between a key and the angle-lever. Fig. 7 is a like view showing a separate or additional pivoted key for operating the tone-prolonging devices and the connections between the latter and the said pivoted key. Fig. 8 is a like view showing the connection between the main key and the angle-lever shown in Fig. 7. Figs. 9 and 10 are sectional elevations showing the additional keys in the raised and depressed positions, and slightly modified means for operating the bar $m$, to free the same and keep it out of action. Fig. 11 is a front elevation of the additional key-board and means for operating the main keys therefrom and showing devices for attaching said parts to an old-style organ. Fig. 12 is an end view of the parts seen in Fig. 11. Figs. 13 and 14 are vertical sections of the additional key-board shown in Figs. 11 and 12, showing the parts in different positions. Fig. 15 is a like view and showing the means for permitting the depressed key or keys to resume their normal positions. Fig. 16 is a vertical section showing the means for maintaining a white key of the main key-board depressed. Fig. 17 is a like view showing the means for maintaining a black key depressed. Fig. 18 is a plan view of the parts shown in Fig. 17.

Referring to the drawings, and more particularly to Figs. 1 to 6 thereof, $a$, indicates a series of knobs or buttons which is arranged longitudinally of and in front of the ordinary main key-board of an organ, harmonium, or similar musical instrument. The number of these buttons will depend upon the number of keys of the main key-board which it is desired to have depressed, i. e., it will depend upon the number of tones that are to be prolonged or continued, there being in practice one button or knob for each tone.

For convenience of manipulation the knobs $a$, are arranged in a single row or bank near the upper end of the front portion A of the instrument case, and each of said buttons or knobs is connected with and adapted to operate its own and separate set of devices, each of which sets is connected with and adapted to operate a separate key of the instrument.

In order to avoid confusion in the reading of the drawings I have omitted to show the entire number of sets of operating devices for the keys, but have shown but one of said sets which will be sufficient for a clear understanding of the invention.

Each of the knobs $a$, is carried by a rod $f$, which passes loosely and is adapted to reciprocate through an opening in the portion A of the instrument case, and each of the knobs is adapted when pushed inwardly to be received within recesses $A^2$ in said portion A. (See Fig. 3.) Upon the rear end of each rod $f$, is an enlargement or shoulder $k$, which is provided with a groove $l$. The rear end of the rod $f$, is also enlarged as shown at $i'$, and is also provided with a second shoulder $i$, somewhat lower than the shoulder $k$.

$m$, indicates a bar or strip which is arranged longitudinally of and above the rear ends of the rods $f$, and said bar is provided with a lip or bent end $m'$. In its normal position the bar $m$, lies as shown in Fig. 2, its edge $m'$ resting upon the enlarged rear end of the rods $f$, but when a knob or knobs $a$, are pushed inwardly, said end $m'$ rides up and over the shoulder $i'$ and engages the grooves $l$, of said rods $f$, as shown in Fig. 3. The bar $m$, may be supported in place at its ends or other points in any suitable manner so as to permit it to have a slight swinging or pivotal movement necessary for it to engage and free the grooves $l$. Each of the rods $f$, is adapted when pushed inwardly to operate an angle-lever $b$—$c$—$d$, the arm $c$, of which passes loosely through and is supported in a bearing bracket $e$, secured to the instrument case. The arm $d$, of said angle-lever is connected with a rod or link $h$, which at its upper end is hooked to the under side of a key $g$. The arm $b$, of the angle lever lies normally in a nearly vertical position in rear of a knob $a$, so as to be pressed upon by a rod $f$, when its corresponding knob is operated. It will thus be seen that when it is desired to produce a certain tone and keep the same prolonged the knob $a$, of the particular key is pushed inwardly causing its angle-lever to be oscillated and through the medium of link $h$ the key will be drawn down and its corresponding tone caused to sound. The inward movement of the knob continues until the lip $m'$ of bar $m$, rides over the shoulder $i$ and engages the groove $l$, thus preventing the key from rising.

The tone produced may be prolonged until a knob of another key is operated, and when such a knob is pushed inwardly, its shoulder $i$ will by riding beneath the lip $m'$ of bar $m$ raise the latter sufficiently to permit the shoulder $i$ of the knob previously pressed in to slide from beneath said lip $m'$ and allow the corresponding key to rise, its tone then ceasing. This sliding movement of the rod $f$, and knob, is caused by the action of the usual spring which is arranged to act upon the key and connected parts which as is well known always have a tendency to rise, under the stress of its spring and being sufficient in the present case to always effect the forwardly-sliding movement of rod $f$, at the moment that the lip $m'$ is raised to clear the shoulder $i$. It will thus be seen by the described arrangement of devices that but one tone will be permitted to be prolonged at a time. It may however, be desired to have several tones prolonged simultaneously and to effect this object the knobs $a$, corresponding to the tones desired produced must be pushed in simultaneously so that all the grooves $l$, of rods $f$, will be engaged simultaneously by the lip $m'$ of bar $m$.

If it be desired at any time to cause a cessation of a tone being prolonged, I provide means for effecting this, such means being shown in Figs. 4 and 5.

In Fig. 4, $n$, indicates a button or knob which passes vertically through an opening $n'$ in the top plate $A'$ of the instrument and to one side of the series of knobs $a$. The lower end of the rod $n^2$ of knob $n$ is adapted to bear upon one end of a lever $q$, pivoted upon a bracket $q'$, the opposite end of said lever being adapted to bear upon the under side of the lip $m'$ of bar $m$. By pressing the button $n$ downwardly the lever $q$ causes the bar $m$, to rise so as to free the grooves $l$, of such knobs $a$, as may have been previously engaged by said bar $m$.

In Fig. 5 I employ a bell-crank lever $o$, which is pivoted at $o'$ to portion A. One arm of said lever projects upwardly through a slot in the top plate $A^2$ and the other arm of said lever is adapted to bear upon and raise the bar $m$, when the said lever is pushed in the direction of the arrow.

In Figs. 7 to 10 I show a slight modification in my improved devices. In this instance I employ a series of pivoted supplementary key-levers $a'$ instead of knobs or buttons $a$, said levers being arranged in a bank above the main key-board. Each of the key-levers $a'$ bears at its under side upon the upper end of a rod $f^3$ vertically movable through a slot in the key $g$, lying beneath it. The lower end of rod $f^3$ is provided with a shoulder $k$, a groove $l$, and a second shoulder $i$, and is adapted to act upon the arm $b$, of the angle-lever $b$—$c$—$d$, the arm $c$, whereof passes loosely through the bracket $e$ secured to a portion of the instrument case beneath the main key-board. A bar $m$, having a lip or bent end $m'$ is provided also in this instance, which is adapted to engage a groove $l$, of a bar or rod $f^3$, when its corresponding knob $a$, is pushed inwardly said lip riding over the shoulder $i$ and falling into the groove $l$. A curved leaf-spring $p$ bears upon the bar $m$, to normally force it into contact with the rods $f$.

For causing at any desired time a cessation of a tone being prolonged I provide a key-lever $n'$ which may be suitably pivoted to the instrument case, said key-lever bearing upon a bar $f^3$ which passes through a perforation in a key $g$ and is provided near its lower end with a shoulder $k'$ which, when the key-lever $n'$ is depressed, is adapted to cause the bar $m$ to oscillate to raise out of the grooves $l$ of the previously depressed rods $f$, and permit the main keys to rise and cause a cessation of their corresponding tones, the rod $f^3$, afterward rising under the stress of the spring $r'$.

For maintaining the bar $m$ out of action I provide a pivoted key-lever $x$ bearing upon a rod $f^2$ which is provided near its lower end with a notched shoulder $o'$. When lever $x$ is depressed the shoulder $o'$ swings the bar $m$ until its lip $m'$ clears said shoulder and falls into the notch thereof. Thus said bar $m$ is retained as shown in Fig. 10 and is held out of operative position. It may be released by pressing lever $n'$, the shoulder $k'$ whereof in practice should be sufficiently great to swing the bar $m$ enough to clear the shoulder $o'$ of rod $f^2$, which, under the stress of the spring $r$, bearing on its lower end rises to its normal position.

In Figs. 11 to 18 I have shown an arrangement of my devices adapted more especially for attachment to old-style organs, &c. In this arrangement I employ a series of knobs or buttons $a$, arranged in a bank, the rods $f$, of said knobs passing through a case $f^x$ which is secured to the front side of the casing $w'$ by screws $w^3$, which casing $w'$ is adapted to be detachably secured to the instrument case by means of standards S. One of these standards is secured at each end of the case $w'$ and is made in sections $s$, $s'$, which may be adjustably secured to each other by the set-screw $S'$, the lower end of section $s$, being bent at right angles as shown at $s^2$, through which bent end passes a securing screw $S^2$ adapted to be adjusted to bear upon the under side of the organ case. By this construction of the standards S, the parts may be secured to the organ case, and when desired they may be readily detached therefrom by loosening the screws $S^2$, as will be understood.

The construction and relative arrangement of the rods $f$, bar $m$, and angle-levers $b$—$c$—$d$ are similar to those described hereinbefore with reference to Figs. 1 to 6, and the construction and relative arrangement of the devices $n$, $m$, $q$, for releasing a depressed key to cause a cessation of a tone, are similar to those described with reference to Fig. 4.

The means for effecting a depression of a key or keys from the angle-levers $b$—$c$—$d$ differ slightly in the present instance from those shown in the remaining figures of the drawings. In this instance the links $h$, instead of being connected directly to a key are each connected to an intermediate lever which in turn is adapted to operate upon the upper face of a key to depress the same.

For depressing a white key I employ as shown in Figs. 16 and 18, a bent or curved lever $t$ to which is connected the link $h$, which for this purpose is threaded at its upper end and carries an adjusting nut $h'$. The forward end of lever $t$, is pivoted upon a rod $v$, carried by the case $w'$, while the opposite end of said lever is curved upwardly and lies over a white key of the instrument and in position to depress said key when said lever $t$, is drawn down by the angle-lever $b$—$c$—$d$ in the manner before described.

For operating a black key I employ, as shown in Figs. 17 and 18, a bent or curved lever $w$, which is connected to the lever $b$—$c$—$d$ in a manner similar to the lever $t$, and is also pivoted upon the rod $v$. The lever $w$ is made sufficiently thin to allow it to pass upwardly between two of the white keys, and is broadened as at $w^2$ so as to engage and depress a black key when operated by the angle lever $b$—$c$—$d$.

It will be seen that in the modified arrangements of devices herein described and shown in the drawings, the principle of construction and operation is the same in all, and it will also be seen that by my invention considerable labor is saved the performer in playing, and that he is enabled to produce more beautiful musical effects than would be possible were no such devices employed, and the numerous advantages will be at once apparent to performers upon the class of instruments to which my invention is adapted.

What I claim, and desire to secure by Letters Patent of the United States, is—

1. The combination with an organ or similar musical instrument, of devices for depressing a key of such instrument and maintaining the same in a depressed position, consisting essentially of a sliding rod, a bar adapted to engage and hold said rod at a certain point in the movement thereof, a pivoted lever against which the sliding rod bears and is adapted to operate, and a connection between said pivoted lever and the key and adapted to depress and retain the latter when the pivoted lever is oscillated, as described.

2. The combination with an organ or similar musical instrument and devices for depressing a key of such instrument, consisting essentially of a sliding rod, a bar adapted to engage and hold said rod at a certain point in its movement, a pivoted lever against which the sliding rod bears and is adapted to operate, and a connection between said pivoted lever and the key and adapted to depress and retain the latter when the pivoted lever is oscillated, of means for releasing the sliding rod from the bar to allow the depressed key to rise, as described.

3. The combination with an organ or similar musical instrument, of devices for depressing a key of such instrument, consisting in the combination with a rod $f$, adapted to have a sliding movement, a shoulder and a groove on said rod, a bar or plate adapted to ride over the shoulder of the rod and engage the groove thereof, a pivoted angle-lever, one arm of which lies against one end of the sliding rod and is adapted to be operated thereby, and a link connected at one end to the said lever and at its opposite end with a key, as described.

4. The combination with an organ or similar musical instrument, of devices for depressing a key of such instrument consisting in the combination with a rod $f$, adapted to have a sliding movement, a shoulder and a groove on said rod, a bar or plate adapted to ride over the shoulder of the rod and engage the groove thereof, a pivoted angle-lever, one arm of which lies against one end of the sliding rod, and is adapted to be operated thereby, and a link connected at one end to said lever and at its opposite end with a key, a sliding rod $n'$, a rocking lever $q$, adapted to be rocked by the rod $n'$ when the latter is depressed, said lever taking beneath and adapted to raise the bar out of engagement with the groove of rod $f$, for the purpose specified.

5. The combination with an organ or similar musical instrument, of a series of buttons or knobs $a$, arranged in a bank, a rod $f$, connected with each of said knobs and adapted to have a sliding movement through the instrument case, shoulders $i$, $k$, on each of said rods, a groove $l$, between said shoulders, a bar $m$, having a lip or bent end adapted to engage the groove $l$ when the rod $f$ is pushed inwardly, an angle-lever $b$—$c$—$d$ pivoted in a bearing, the arm $b$, of which lever lies in rear of and is adapted to be operated by the rod $f$ when the latter is operated, and a link $h$, connected at one end to the arm $d$, of said angle-lever, and at its opposite end to a key, all arranged for cooperation, as described.

6. The combination with an organ or similar musical instrument, of a series of buttons or knobs $a$, arranged in a bank, a rod $f$, connected with each of said knobs and adapted to have a sliding movement through the instrument case, shoulders $i$ $k$ on each of said rods, a groove $l$, between said shoulders, a bar $m$, having a lip or bent end adapted to engage the groove $l$ when the rod is pushed inwardly, an angle-lever $b$—$c$—$d$ pivoted in a bearing, the arm $b$, of which lever lies in rear of and is adapted to be operated by the rod $f$, and a link $h$, connected at one end to the arm $d$ of said angle-lever and at its opposite end to a key, and means for releasing the rod $f$ from the bar $m$ consisting of the button $n$, the bar $n'$ carrying said button, a pivoted lever $q$, one arm of which lies beneath the bar $m$, and the other arm lying beneath the rod $n'$ and adapted to be rocked thereby to cause the raising of the bar $m$, as described.

7. The combination with an organ or similar musical instrument, of a series of buttons or knobs $a$, a rod $f$, connected with each of said knobs and adapted to have a sliding movement through the instrument case, shoulders $i$, $k$, on each of said rods, a groove $l$, between said shoulders, a bar $m$, having a lip or bent end adapted to engage the groove $l$, when the rod is pushed inwardly, an angle-lever $b$—$c$—$d$ pivoted in a bearing, the arm $b$, of which lever lies in rear of and is adapted to be operated by the rod $f$, and a link $h$, connected at one end to the arm $d$, of said angle-lever and at its opposite end to a key, and means for releasing the rod $f$, from the bar $m$, as described.

In witness whereof I have hereunto signed my name in the presence of two subscribing witnesses.

ANTON HUGO BEYER.

Witnesses:
MARTIN FALLENIUS,
EUGÈNE BERG.